UNITED STATES PATENT OFFICE.

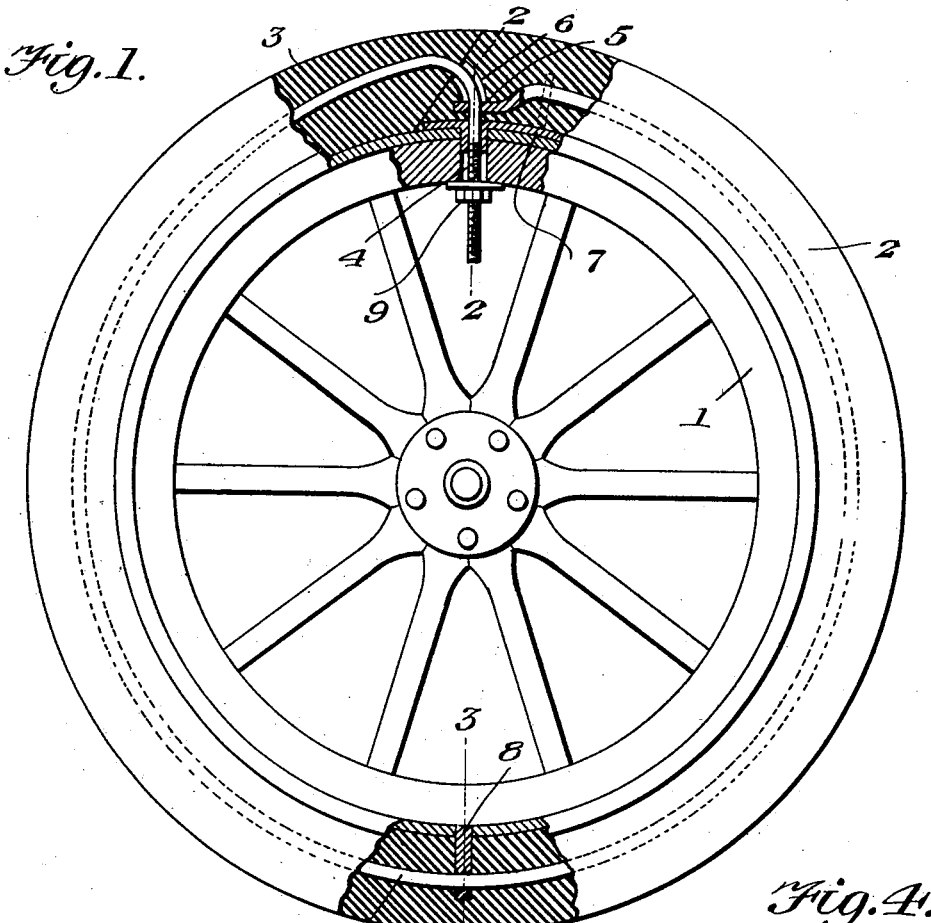
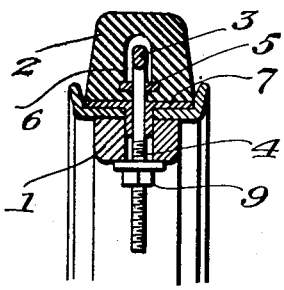
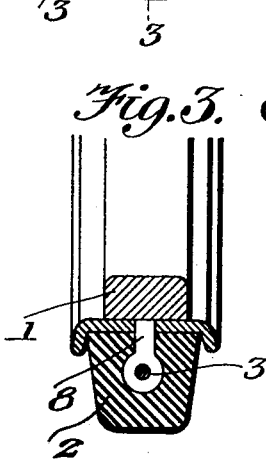
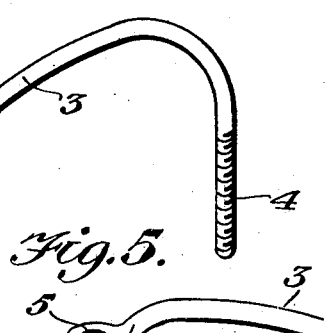

DOMINIC D. SWAGER, OF DENTON, MONTANA.

TIRE.

1,370,380.

Specification of Letters Patent.

Patented Mar. 1, 1921.

Application filed May 11, 1920. Serial No. 380,578.

*To all whom it may concern:*

Be it known that I, DOMINIC D. SWAGER, a citizen of the United States, residing at Denton, in the county of Fergus and State of Montana, have invented new and useful Improvements in Tires, of which the following a specification.

This invention relates to an emergency tire for automobiles and other vehicles and the principal object of the invention is to provide a solid rubber tire with means for easily and quickly attaching it to a wheel in place of the usual pneumatic tire when the same has become deflated.

Another object of the invention is to provide a cable for preventing stretching of the solid tire when on the wheel, with means engaging the cable for securing the tire to the wheel.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side elevational view of the wheel showing my emergency tire applied thereto, parts being in section.

Fig. 2 is a section on line 2—2 of Fig. 1.

Fig. 3 is a section on line 3—3 of Fig. 1.

Figs. 4 and 5 are enlarged detail views.

In these views 1 indicates the wheel and 2 indicates my tire which, as will be seen, is made of solid material, preferably rubber or of rubber composition. This tire may be of any cross sectional shape, though I prefer to make it of the shape shown. This tire is made in the form of a split ring, as shown. A steel wire or cable 3 passes through the tire with one end projecting from one end thereof, the extremity of this end being made in the form of a screw threaded bolt, an indicated at 4. The other end of the wire or cable is formed with an eye 5 and this eye is arranged in an opening 6 formed in the end of the tire, this opening being so formed as to permit the bolt end to be passed through this end of the tire and the eye. A plate 7 is secured to the eye end of the tire on its inner face and this plate is so formed as to have a portion engaged with the socket formed in the rim and arranged to receive the valve of the usual pneumatic tire. This plate may be secured to the tire by nails as shown in dotted lines in Fig. 1 or in any other suitable way. A stud 8 is carried by the tire and this stud is adapted to engage a part of the rim of the wheel to prevent the tire creeping on the rim.

In applying my tire to a wheel the bolt 4 is passed through the eye 5 and through the valve hole in the rim. A nut 9 is then placed on the projecting end of said bolt and screwed tight thereon to contract the cable and thus firmly clamp the tire to the rim. The beveled edges will be drawn together by this tightening action so as to make a closed joint.

My device is intended to take the place of the pneumatic tire when the same should become deflated for any reason and there is no spare tire to take its place or the driver does not wish to go to the trouble of exchanging one pneumatic tire for the other. The drawing shows the invention used with a continuous rim, such as used on the Ford type of automobile but where the invention is used with a transversely split rim and the split is directly opposite the valve opening the stud 8 must be located at another place than that shown in the drawing so as to avoid the split.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A tire of the class described formed of solid material and in the form of a split ring, the ends of said tire being beveled and one end having an opening therein, passing through the beveled end and through the inner periphery of the tire, a cable embedded in said material and having an eye at one end alined with said opening, the other end of the cable projecting from the other end of the tire and having screw threads thereon and arranged to be passed through the opening and eye and through the valve opening in the rim, a nut for engaging the screw threaded part and the inner periphery of the felly and means for preventing creeping of the tire on the rim.

2. A tire of the class described formed of solid material and having beveled ends and one end having an opening leading from the beveled face to the inner periphery, a cable embedded in the tire and having an eye at one end alined with said opening, the other end of the cable projecting from the other end of the tire and having screw threads thereon and arranged to pass through the opening and the eye and the valve opening in the rim, a plate secured to the inner part of the tire at the end which is provided with the opening, said plate having an opening therein through which passes the screw threaded end of the cable and a projection for engaging the valve opening in the rim and a nut for engaging the screw threaded part of the cable and the inner periphery of the felly.

In testimony whereof I affix my signature.

DOMINIC D. SWAGER.